US009855708B2

(12) United States Patent
Kao et al.

(10) Patent No.: US 9,855,708 B2
(45) Date of Patent: Jan. 2, 2018

(54) THREE-DIMENSIONAL PRINTING DEVICE AND METHOD FOR STORING PRINTING DATA THEREOF

(71) Applicants: XYZprinting, Inc., New Taipei (TW); Kinpo Electronics, Inc., New Taipei (TW); Cal-Comp Electronics & Communications Company Limited, New Taipei (TW)

(72) Inventors: Tien-I Kao, New Taipei (TW); Ting-Yu Lu, New Taipei (TW)

(73) Assignees: XYZprinting, Inc., New Taipei (TW); Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 286 days.

(21) Appl. No.: 14/873,175

(22) Filed: Oct. 1, 2015

(65) Prior Publication Data
US 2016/0361876 A1 Dec. 15, 2016

(30) Foreign Application Priority Data
Jun. 10, 2015 (CN) .......................... 2015 1 0315079

(51) Int. Cl.
| | | |
|---|---|---|
| *G05B 19/4099* | (2006.01) | |
| *B29C 67/00* | (2017.01) | |
| *B29K 105/00* | (2006.01) | |
| *B33Y 10/00* | (2015.01) | |
| *B33Y 30/00* | (2015.01) | |
| *B33Y 50/02* | (2015.01) | |

(52) U.S. Cl.
CPC ...... *B29C 67/0088* (2013.01); *G05B 19/4099* (2013.01); *B29K 2105/0058* (2013.01); *B33Y 10/00* (2014.12); *B33Y 30/00* (2014.12); *B33Y 50/02* (2014.12); *G05B 2219/35134* (2013.01); *G05B 2219/49007* (2013.01)

(58) Field of Classification Search
None
See application file for complete search history.

(56) References Cited

U.S. PATENT DOCUMENTS

| 8,836,757 | B2 * | 9/2014 | Jang | ..................... | G11B 27/105 348/42 |
|---|---|---|---|---|---|
| 2002/0149137 | A1 * | 10/2002 | Jang | ..................... | G03F 7/0037 264/494 |

(Continued)

*Primary Examiner* — Isaac T Tecklu
(74) *Attorney, Agent, or Firm* — JCIPRNET

(57) ABSTRACT

A three-dimensional printing device including a processing unit and a mixing unit is provided. The processing unit formats a sliced file into a printing head signal file, wherein the sliced file and the printing head signal file correspond to a three-dimensional structure, the sliced file includes layer data corresponding to a plurality of layers of the three-dimensional structure, and the print head signal file includes layer printing data corresponding to the layers of the three-dimensional structure. The mixing unit combines part of the layer data in the sliced file and part of the layer printing data in the printing head signal file to derive a hybrid file, and stores the hybrid file in a storing unit of the electronic device, wherein the layer data and the layer printing data in the hybrid file correspond to different layers of the three-dimensional structure.

12 Claims, 2 Drawing Sheets

(56) References Cited

U.S. PATENT DOCUMENTS

| | | | |
|---|---|---|---|
| 2010/0247742 A1* | 9/2010 | Shi | C23C 24/04 427/8 |
| 2011/0221100 A1* | 9/2011 | Wesselky | B05B 3/1092 264/401 |
| 2012/0050502 A1* | 3/2012 | Chi | H04N 13/0029 348/51 |
| 2015/0120033 A1* | 4/2015 | Hotta | G05B 19/4099 700/119 |
| 2016/0107380 A1* | 4/2016 | Smoot | B29C 67/0062 264/401 |
| 2016/0185043 A1* | 6/2016 | Klappert | B29C 67/0088 264/40.1 |
| 2017/0176979 A1* | 6/2017 | Lalish | G05B 19/4099 |

* cited by examiner

THREE-DIMENSIONAL PRINTING DEVICE AND METHOD FOR STORING PRINTING DATA THEREOF

CROSS-REFERENCE TO RELATED APPLICATION

This application claims the priority benefit of China patent application serial no. 201510315079.1, filed on Jun. 10, 2015. The entirety of the above-mentioned patent application is hereby incorporated by reference herein and made a part of the specification.

BACKGROUND OF THE INVENTION

1. Field of the Invention

The invention relates to a three-dimensional printing device, and relates particularly to a three-dimensional printing device and a method for storing printing data thereof.

2. Description of Related Art

In recent years, along with increasing developments in industrial technology, many different methods using layer by layer model construction and the like additive manufacturing technology for constructing three-dimensional (3D) models have already been proposed. Generally speaking, additive manufacturing technology converts design data of a 3D model which is constructed by computer aided a design (CAD) and such software into a plurality of consecutively stacked thin cross-section layers. A printing module of a printing device typically moves above a base along an XY plane according to space coordinates XYZ constructed by the design data of the 3D model, such that a construction material is formed accurately in a shape of the cross-section layer.

In the above technology, a control terminal (for example, a personal computer connected with the printing device) or the printing device is required to first convert the design data, for example, a graphics file including each of the cross-section layer data into a coded signal which is identifiable by the printing head of the printing device before printing the 3D model. However, converting the graphics file into the coded signal which is identifiable by the printing head of the printing device will consume a great amount of time. When a same 3D model is requested to be printed again, a significant amount of time would be consumed every time the conversion is performed. However, on the other hand, a size of the entire data of the coded signal which is identifiable by the printing head is also significantly large. Therefore, if the converted coded signal is stored directly in order to save the time consumed by a repeat print, then a storage space that is required will not be small. Thus, how to achieve a suitable balance between the time consumed and the storage space is a problem which needs to be solved by a person skilled in the art.

SUMMARY OF THE INVENTION

The invention provides a three-dimensional printing device and a method for storing printing data thereof, which may correspondingly store a part of an original data of the printing content and a part of a printing signal data that has been converted.

A three-dimensional printing device of the invention includes a processing unit and a mixing unit. The processing unit formats a sliced file into a printing head signal file. Wherein, the sliced file and the printing head signal file correspond to a three-dimensional structure, the sliced file comprises layer data corresponding to a plurality of layers of the three-dimensional structure and the printing head signal file comprises layer printing data corresponding to the layers of the three-dimensional structure. The mixing unit is coupled with the processing unit, and combines part of the layer data in the sliced file and part of the layer printing data in the printing head signal file according to a storage ratio so as to derive a hybrid file, and stores the hybrid file in a storing unit of the three-dimensional printing device, wherein the layer data and the layer printing data in the hybrid file correspond to different layers of the three dimensional structure.

A method for storing printing data of the invention is adapted for a three-dimensional printing device and includes the following steps of formatting a sliced file into a printing head signal file, wherein the sliced file and the printing head signal file correspond to a three-dimensional structure, the sliced file comprises layer data corresponding to a plurality of layers of the three-dimensional structure and the printing head signal file comprises layer printing data corresponding to the layers of the three-dimensional structure; and combining part of the layer data in the sliced file and part of the layer printing data in the printing head signal file according to a storage ratio so as to derive a hybrid file, and stores the hybrid file in a storing unit of the three-dimensional printing device, wherein the layer data and the layer printing data in the hybrid file correspond to different layers of the three dimensional structure.

Based on the above, the invention provides a three-dimensional printing device and a method for storing printing data thereof, where a part of the original data (namely, the layer data in the sliced file) and a part of coded signal which is identifiable by the printing head (namely, the layer printing data in the printing head signal file), such that a balance may be obtained between time consumed and data storage during repeat prints.

Several exemplary embodiments accompanied with figures are described in detail below to further describe the disclosure in details.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
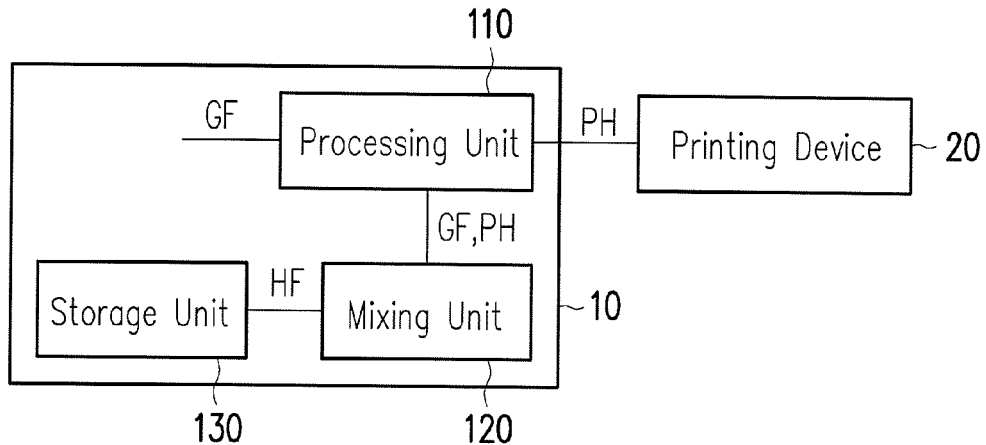
FIG. 1 is a block diagram illustrating a three-dimensional printing device and functions of a printing device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram illustrating a three-dimensional printing device and functions of a printing device according to an embodiment of the invention. Referring to FIG. 1, a three-dimensional printing device 10 includes a processing unit 110, a mixing unit 120 and a storage unit 130. The processing unit 110 receives a sliced file GF and formats the sliced file GF into a printing head signal file PH, wherein the sliced file GF and the printing head signal file PH both correspond to a three-dimensional structure. The sliced file GF includes layer data corresponding to a plurality of layers of the three-dimensional structure. The printing head signal file PH includes layer printing data corresponding to the plurality of layers of the three-dimensional structure. The mixing unit 120 is coupled to the processing unit 110, and combines part of the layer data in the sliced file GF and part of the layer printing data in the printing head signal file PH according to a storage ratio, so as to derive a hybrid file HF, and the hybrid file HF is stored in the storage unit 130, wherein the layer data and the layer printing data in the hybrid file HF correspond to different layers of the three-dimensional structure.

Figure 2:
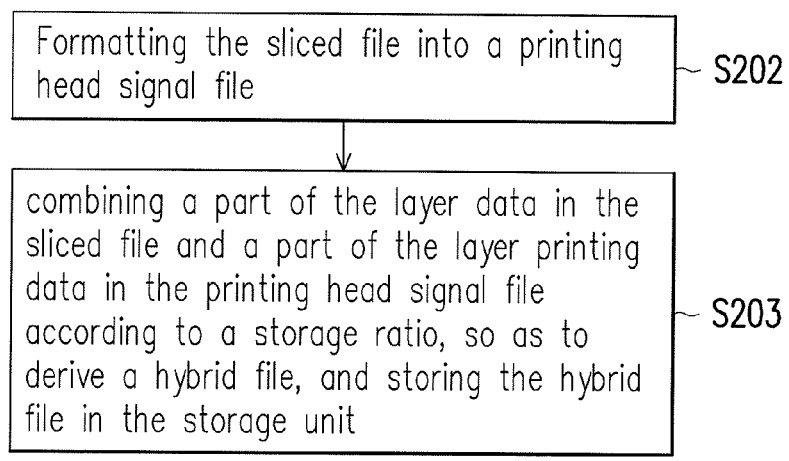
FIG. 2 is a flow diagram of a method for storing printing data according to an embodiment of the invention.

FIG. 2 is a flow diagram of a method for storing printing data according to an embodiment of the invention, wherein the method is adapted for the three-dimensional printing device shown in FIG. 1. Referring to FIG. 2, first, in a step S202, a sliced file is formatted to a printing head signal file, wherein the sliced file and the printing head signal file correspond to a three-dimensional structure. The sliced file includes layer data corresponding to a plurality of layers of the three-dimensional structure, and the printing head signal file includes layer printing data corresponding to the plurality of layers of the three-dimensional structure. Next in a step S203, part of the layer data in the sliced file and part of the layer printing data in the printing head signal file are combined according to a storage ratio to derive a hybrid file, and the hybrid file is stored in a storage unit of the three-dimensional printing device, wherein the layer data and the layer printing data in the hybrid file correspond to different layers of the three-dimensional structure.

The three-dimensional printing device 10 shown in FIG. 1 may be a personal computer or a notebook computer, which is connected to a printing device 20 (for example, a 3D printer). In addition, in other embodiments of the invention, the three-dimensional printing device 10 may also be integrally disposed with the printing device 20. The processing unit 110 and the mixing unit 120 may be implemented by adopting a physical circuit or be implemented by a processor executing a corresponding program; however the invention is not limited thereto.

Simply put, when the processing unit 110 of the three-dimensional printing device 10 receives a print request corresponding to a three-dimensional structure, the processing unit 110 also receives an original drawing corresponding to the three-dimensional structure, for example, a vector graphics file with a .STL file extension. Then, the processing unit 110 may slice the original drawing so as to obtain the sliced file GF, wherein layer data in the sliced file GF are used to represent the three-dimensional structure. After generating the sliced file GF and after the processing unit 110 converts the encoding of the sliced file GF (namely the above formatting) into a code signal (namely the above printing head signal file PH and the layer printing data included therein) identifiable by the printing head of the printing device 20, wherein the code signal is then transmitted to the printing device 20 at once or in batches, such that the printing device 20 may execute the printing process corresponding to the three-dimensional structure, according to each layer printing datum in the printing head signal file PH. The sliced file GF includes a plurality of cross-sectional drawing files (namely, the above mentioned layer data) corresponding to the three-dimensional structure wherein consecutive cross-sectional drawing files represent layers in the three-dimensional structure which are stacked with each other. The sliced file GF may be a bitmap type image file, or may be a vector graphics type image file. In the present embodiment, the sliced file GF is a vector graphics file with a file extension of .SVG corresponding to the scalable vector graphics (SVG) format; however the invention is not limited thereto.

After the printing head signal file PH corresponding to the sliced file GF completes (namely, converting the coding of the layer data in the sliced file GF to the layer printing data in the printing head signal file PH), the mixing unit 120 may store part of the sliced file GF and part of the printing head signal file PH so as to make up a hybrid file HF according to the storage ratio, such that when the next time the processing unit 110 receives a printing request corresponding to the three-dimensional structure of the sliced file GF, then a part of the printing head signal file PH (namely corresponding to the part of the layer printing data in the above mentioned hybrid file HF) does not need to be generated again, so as to achieve a time saving effect. However, because the data size of the printing head signal file PH is significantly larger than the sliced file GF, therefore a part of the sliced file GF may also be stored in the hybrid file HF so as to save space of the storage unit 130. The next time when the processing unit 110 receives a print request for the three-dimensional structure corresponding to the sliced file GF again, then the processing unit 110 may format the sliced file GF into the corresponding layer printing data.

Figure 3A:
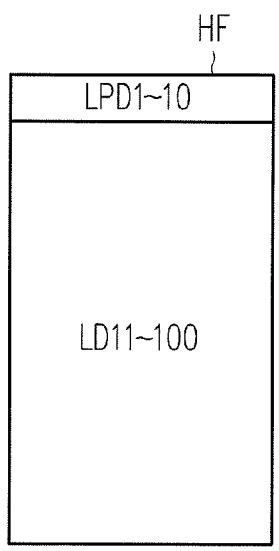
FIG. 3A~FIG. 3C are schematic diagrams illustrating a relationship of a storage ratio between layer data and layer printing data which are in a hybrid file according to embodiments of the invention.
Figure 3B:
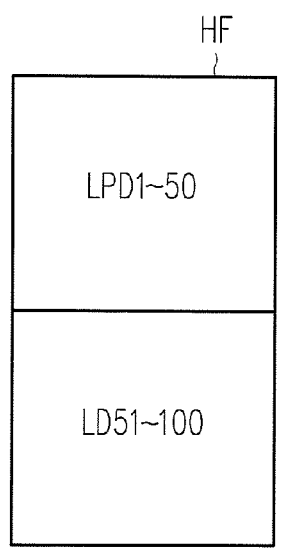
Figure 3C:
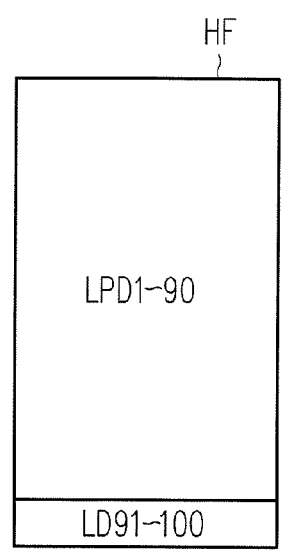

FIG. 3A~FIG. 3C are schematic diagrams illustrating a relationship of a storage ratio between layer data and layer printing data which are in a hybrid file according to embodiments of the invention. Wherein, in the embodiments shown in FIG. 3A~FIG. 3C, the three-dimensional structure includes 100 layers of cross-sections. Therefore, the sliced file GF includes 100 layer data (labelled as LD 1~100 below) and the printing head signal file PH includes 100 layer printing data (labelled as LPD 1~100 below). FIG. 3A shows a case in which the storage ratio of the hybrid file HF is 90%, namely, the hybrid file HF includes 90% layer data of the sliced file GF and 10% layer printing data of the printing head signal file PH. It should be noted, in the embodiment shown in FIG. 3A, those stored as layer printing data, namely those that have completed formatting, are the layers 1 to 10 (namely, the layer printing data LPD 1~10), and those stored that correspond to the layer data in the sliced file GF are the layers 11~100 (namely the layer numbers LD 11~100). In this way, when the processing unit 110 receives a printing request corresponding to the hybrid file HF, part or all of the layer printing data LPD1~10 may be directly transmitted to the printing device connected with the three-dimensional printing device 10, such that when the processing unit 110 is formatting the remaining layer data LD 11~100, the printing device may first execute the printing process according to the content of the layer printing data LPD 1~10, so as to achieve a state of printing and converting at the same time, further saving the time for printing the three-dimensional structure.

FIG. 3B and FIG. 3C shows a case in which the storage ratio is 50% and 10% respectively. That is to say, the hybrid file HF shown in FIG. 3B includes 50% layer data and 50% layer printing data (the layer printing data LPD 1~50 and the layer data LD 51~100), and the hybrid file HF shown in FIG. 3C includes 10% layer data and 90% layer printing data (the layer printing data LPD 1~90 and the layer data LD 91~100). In regards to FIG. 3A~FIG. 3C and the corresponding storage ratios thereof, the hybrid file HF shown in FIG. 3A retains the smallest amount of layer printing data, therefore saves the most storage space of the storage unit 130, however consumes the most amount of time when formatting the layer data in the hybrid file HF into the layer printing data (namely, formatting the layer data LD 11~100 to the layer printing data LPD 11~100) again. The hybrid file HF shown in FIG. 3C retains the most amount of layer printing data, therefore consumes the most amount of space of the storage unit 130, however, saves the most amount of time when the hybrid file HF is used to generate the layer printing data again.

For example, in an embodiment of a practical application, a size of the sliced vector graphics file (which is in a SVG format) after slicing is completed (namely, the sliced file GF) is 271K. When formatting is complete, a size of the printing head signal file PH of the sliced file GF is 510141 k. According to the storage ratio of FIG. 3B above (namely, 50%), then a size of the hybrid file HF is approximately 255206 k and the time required for converting the code of the layer data of the hybrid file HF into the layer printing data (namely, formatting the layer data LD 51~100 in the FIG. 3B to the layer printing data LPD 51~100) is approximately half of the time required for formatting the sliced file GF into the printing head signal file PH.

In regards to the size settings for the storage ratio, adjustments may be made according to actual needs and it should not be construed as a limitation to the invention. For example, in an embodiment of the invention, the three-dimensional printing device 10 shown in FIG. 1 may further include an input output unit adapted for user interaction (for example, a touch panel, a mouse, a keyboard and the like). The input output unit may be coupled to the processing unit 110 of the three-dimensional printing device 10. When the user desires to set a setting value of the storage ratio according to needs, the processing unit 110 may receive a control signal corresponding to a user input so as to set the setting value of the storage ratio according to the control signal. In this way, the processing unit 110 may transmit the setting value to the mixing unit 120 for the mixing unit 120 to use.

In an embodiment of the invention, the processing unit 110 may actively detect the storage size and the storage size currently remaining in the storage unit 130, and set the storage ratio according to the storage size and the storage size currently remaining.

In an embodiment of the invention, the processing unit 110 obtains a printing time value corresponding to a single layer of the three-dimensional structure from the printing device (for example, when the first layer of the three-dimensional structure has completed printing, then the printing device 20 may return the printing time value required for the first layer to be printed). The processing unit 110 may transmit the printing time value to the mixing unit 120, such that the mixing unit 120 may set the storage ratio according to the printing time value, so as to achieve a working state of printing and converting at the same time. Or, the processing unit 110 may keep track of time for the formatted sliced file GF, so as to obtain a generation time value of the layer printing data of any layer (for example the first layer) in the formatted printing head signal file PH, or an average generation time value of each layer printing datum in the printing head signal file PH. In this way, the mixing unit 120 may receive the generation time of a single layer printing datum from the processing unit 110 or an average generation time value of the entire layer printing data, so as to set the storage ratio according to the generation time of a single layer printing datum or the average generation time value of the entire layer printing data. In the various methods for setting the storage ratio mentioned above, the storage ratio may be set with part or all of the considerations above In summary, the invention provides a three-dimensional printing device and a method for storing printing data thereof. After the generation of the printing head signal file (which is readable by the printing head of the printing device) is completed for the first time, the three-dimensional printing device may store a part of the sliced file and a part of the printing head signal file according to a storage ratio, such that when a printing process for the same three-dimensional structure is performed again, (for example, by the original three-dimensional printing device prints again, or when transmitted to other similar three-dimensional printing devices for printing) the time for formatting again may be reduced, and a balance of the usage of the storage space for the file data may be enhanced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A three-dimensional printing device, comprising:
a processing unit, formatting a sliced file into a printing head signal file, wherein the sliced file and the printing head signal file correspond to a three-dimensional structure, the sliced file comprises layer data corresponding to a plurality of layers of the three-dimensional structure and the printing head signal file comprises layer printing data corresponding to the layers of the three-dimensional structure; and
a mixing unit, coupled with the processing unit, combining part of the layer data in the sliced file and part of the layer printing data in the printing head signal file according to a storage ratio so as to derive a hybrid file, and storing the hybrid file in a storing unit of the three-dimensional printing device, wherein the layer data and the layer printing data in the hybrid file correspond to different layers of the three dimensional structure.

2. The three-dimensional printing device as claimed in claim 1, wherein the processing unit transmits the printing head signal file to a printing device so as to execute a printing process.

3. The three-dimensional printing device as claimed in claim 2, wherein
the processing unit obtains a printing time value corresponding to a single layer of the three-dimensional structure from the printing device, and transmits the printing time value to the mixing unit; and
the mixing unit sets the storage ratio according to the printing time value.

4. The three-dimensional printing device as claimed in claim 1, the three-dimensional printing device further comprises:
an input output unit, coupled with the processing unit, receiving a control signal,
wherein the mixing unit receives the control signal through the processing unit and sets the storage ratio according to the control signal.

5. The three-dimensional printing device as claimed in claim 1, wherein the mixing unit sets the storage ratio according to a storage size of the storage unit.

6. The three-dimensional printing device as claimed in claim 1, wherein the processing unit keeps track of time, so as to obtain an average generation time value value of each layer printing datum in the printing head signal file; and
the mixing unit receives the average generation time value from the processing unit, and sets the storage ratio according to the average generation time value.

7. A method for storing printing data, adapted for a three-dimensional printing device, comprising:
formatting a sliced file into a printing head signal file, wherein the sliced file and the printing head signal file correspond to a three-dimensional structure, the sliced file comprises layer data corresponding to a plurality of layers of the three-dimensional structure and the printing head signal file comprises layer printing data corresponding to the layers of the three-dimensional structure; and
combining part of the layer data in the sliced file and part of the layer printing data in the printing head signal file according to a storage ratio so as to derive a hybrid file, and stores the hybrid file in a storing unit of the three-dimensional printing device, wherein the layer data and the layer printing data in the hybrid file correspond to different layers of the three dimensional structure.

8. The method for storing printing data as claimed in claim 7, wherein after the step of formatting the sliced file into the printing head signal file, the method for storing printing data further comprises:
transmitting the printing head signal file to a printing device so as to execute a printing process.

9. The method for storing printing data as claimed in claim 8, where after the step of transmitting the printing head signal file, the method for storing printing data further comprises:

obtaining a printing time value corresponding to a single layer of the three-dimensional structure from the printing device, and
setting the storage ratio according to the printing time value.

10. The method for storing printing data as claimed in claim 7, wherein before the step of combining the part of the layer data in the sliced file and the part of the layer printing data in the printing head signal file according to the storage ratio so as to derive a hybrid file, there further comprises a step of:
receiving a control signal through an input output unit; and
setting the storage ratio according to the control signal.

11. The method for storing printing data as claimed in claim 7, wherein before the step of combining the part of the layer data in the sliced file and the part of the layer printing data in the printing head signal file according to the storage ratio so as to derive a hybrid file, there further comprises a step of:
setting the storage ratio according to a storage size of the storage unit.

12. The method for storing printing data as claimed in claim 7, wherein the step of formatting the sliced file into the printing head signal file further comprises:
keeping track of time, so as to obtain an average generation time value of each layer printing datum in the printing head signal file; and
before the step of combining the part of the layer data in the sliced file and the part of the layer printing data in the printing head signal file according to the storage ratio so as to derive the hybrid file, there further comprises a step of:
setting the storage ratio according to the average generation time value.

* * * * *